United States Patent
Hunter et al.

(10) Patent No.: US 11,182,973 B2
(45) Date of Patent: Nov. 23, 2021

(54) AUGMENTED REALITY DISPLAY (71) Applicant: Hewlett-Packard Development Company, L.P., Spring, TX (US)

(72) Inventors: Andrew Hunter, Bristol (GB); Madhu Sudan Athreya, Palo Alto, CA (US); Will Allen, Corvallis, OR (US); Carlos Haas, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/760,545

(22) PCT Filed: Jan. 24, 2018

(86) PCT No.: PCT/US2018/015099
§ 371 (c)(1),
(2) Date: Apr. 30, 2020

(87) PCT Pub. No.: WO2019/147237
PCT Pub. Date: Aug. 1, 2019

(65) Prior Publication Data
US 2021/0217242 A1 Jul. 15, 2021

(51) Int. Cl.
*G06T 19/00* (2011.01)
*G06T 7/50* (2017.01)
(Continued)

(52) U.S. Cl.
CPC .............. *G06T 19/006* (2013.01); *G06T 3/40* (2013.01); *G06T 7/50* (2017.01); *G06T 2207/10028* (2013.01)

(58) Field of Classification Search
CPC ........... G06T 19/006; G06T 3/40; G06T 7/50; G06T 2207/10028
See application file for complete search history.

(56) References Cited

U.S. PATENT DOCUMENTS

2003/0169213 A1* 9/2003 Spero ................. G02B 27/0093
345/7
2013/0106910 A1 5/2013 Sacco
(Continued)

FOREIGN PATENT DOCUMENTS

CN 104021590 9/2014
KR 20150108570 9/2015
(Continued)

OTHER PUBLICATIONS

Keita Ushida et al., i-mirror: An Interaction/Information Environment Based on a Mirror Metaphor Aiming to Install into Our Life Space, Dec. 2002, In Proceedings of the 12th International Conference on Artificial Reality and Telexistence (ICAT2002) pp. 113-118. (Year: 2002).*

*Primary Examiner* — Jeffery A Brier
(74) *Attorney, Agent, or Firm* — HP Inc. Patent Department (57) ABSTRACT

In an example, an augmented reality display system includes a reflective surface, a depth scanner and processing apparatus comprising an image processor and an image generation engine. The depth scanner may be to scan the reflective surface and a subject via the reflective surface to acquire depth data. The image processor may be to determine, based on the depth data, a viewpoint for an augmentation of a reflected image. The image generation engine may be to generate the augmentation for display on the reflective surface.

15 Claims, 6 Drawing Sheets

(51) Int. Cl.
   *G06T 3/40*   (2006.01)
   *H04N 13/373*   (2018.01)
   *H04N 13/293*   (2018.01)
   *H04N 13/302*   (2018.01)

(56) References Cited

U.S. PATENT DOCUMENTS

2017/0285345 A1* 10/2017 Ferens .................... G06F 1/163
2017/0358135 A1    12/2017 Trehan
2018/0350148 A1* 12/2018 George ................... G09B 5/02

FOREIGN PATENT DOCUMENTS

| WO | WO-2017108699 | 6/2017 |
| WO | WO-2017108703 | 6/2017 |
| WO | WO-2017204581 A1 | 11/2017 |

\* cited by examiner

AUGMENTED REALITY DISPLAY

BACKGROUND

Augmented reality display systems include so called "augmented mirror" arrangements, in which a reflection may be augmented with additional visual content. For example, a reflection of a face may be augmented with digitally generated facial hair, or a hat, or the like, or background/foreground objects may be added or supplemented. In examples of such systems, an image or depth scan of a user may be obtained in order to determine where to place augmentations, for example using a depth scanner/imager integral to the frame of the mirror.

BRIEF DESCRIPTION OF DRAWINGS

Non-limiting examples will now be described with reference to the accompanying drawings, in which.

DETAILED DESCRIPTION

Figure 1:
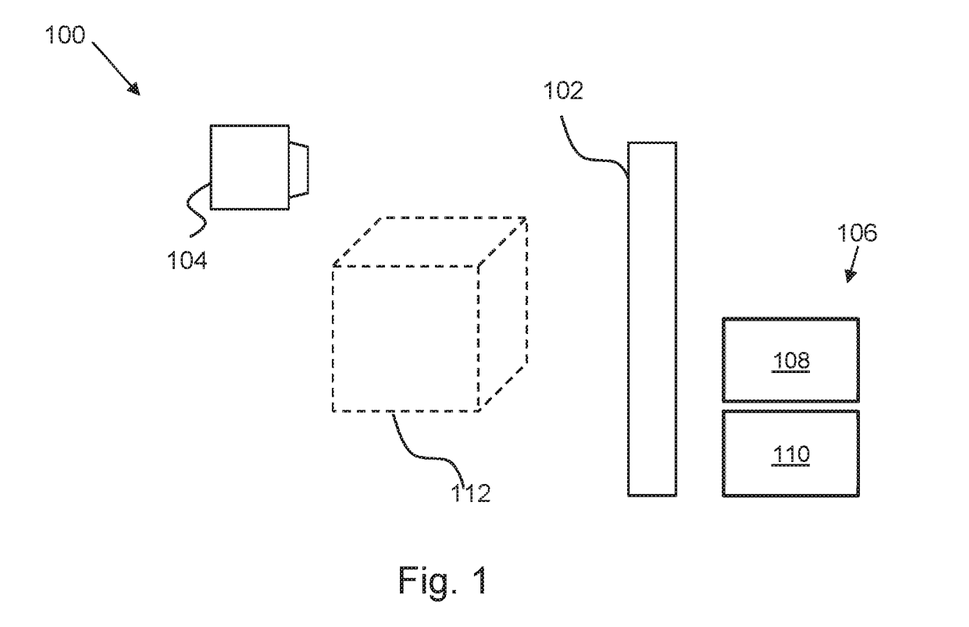
FIG. 1 shows an example of an augmented reality display system.

FIG. 1 shows an example of an augmented reality display system 100 comprising a reflective surface 102, a depth scanner 104 and processing apparatus 106. The processing apparatus 106 comprises an image processor 108 and an image generation engine 110. The image processor 108 and the image generation engine 110 may be housed together or separately.

The reflective surface 102 may comprise any at least partially reflective surface. For example, it may comprise a mirrored surface, a part-silvered (or partially reflective) mirror, a reflective glass, plastic or metal sheet. While in some examples, the reflective surface 102 is planar, this need not be the case in all examples, and in some examples, the reflective surface may be curved. The reflective surface 102 may comprise a surface which reflects light from the environment in front thereof, but can also emit light from its surface (for example, passing through the reflective layer from a display panel mounted behind it, or via refractive elements within the reflective surface 102 or the like).

The depth scanner 104 may comprise a depth camera, i.e. a digital camera that captures an image where the value of each pixel is a measure of the distance from the camera to the corresponding point in the scene being photographed. In some examples, as described in greater detail below, the depth scanner 104 may comprise a camera which also captures a conventional image from the visible part of the electromagnetic spectrum such that the corresponding pixels of the depth image and conventional image relate to the same points in the camera view. However, the depth scanner 104 may comprise any kind of depth scanner, for example using structured light projection (for example projection of an array of infrared dots, wherein detection of changes to the pattern in a captured infrared image can be used to triangulate the location of a point from which each dot was reflected), time-of-flight analysis, radar, LI DAR, stereo imaging (in which two sensors may be used to obtain stereo images in the visual, infrared and/or UV range) and the like.

It may be noted that the depth scanner 104 in this example is separate from, and pointed towards, the reflective surface 102. In use of the system 100, the depth scanner 104 is to scan the reflective surface 102 and a subject 112 via the reflective surface 102 to acquire depth data.

The image processor 108 then determines, based on the depth data, a viewpoint for an augmentation of a reflected image. In the case of a human subject, this may be the position of their eyes. However, in principle, the viewpoint may be a viewpoint of another person or an imaging device such as a camera which is positioned with a view of the reflective surface, or any other view point of the scene.

The image processor 108 may receive the depth data by wired or wireless connection with the depth scanner 104. In some examples, the depth scanner 104 and the image processor 108 may be co-located, for example within a common housing, but in other examples they may be located at a distance from one another. For example, the image processor 108 may be mounted in association with the reflective surface 102.

The image generation engine 110 generates the augmentation for display on the reflective surface 102. The augmentation may be positioned such that it has an intended relationship to the subject when viewed from the viewpoint. Assuming the subject is also the intended viewer of the augmentation, this may for example comprise altering the image of the subject as seen by the subject, for example to add clothing, accessories, or to change facial characteristics or the like. For example, virtual glasses may be placed over a subject's eyes, when viewed by the subject. It may be noted that, for another viewpoint, the glasses may be displaced relative to a subject's eyes.

As such, the reflective surface 102 may comprise, or be associated with, a display panel that can attenuate the reflection as well as emit additional light and/or a 3D display panel so the augmentation data aligns with the reflection in 3D rather than just in 2D (i.e. appears to be at the appropriate depth behind the mirror). In some examples, more than one viewpoint may be calculated. For example the position of each eye may be calculated and separate left and right eye projections may be generated and displayed, for example using a stereo-based or lenticular 3D display panel. In some examples, a user may use a viewer (e.g. "3D glasses") to view the display, and images for use with such viewers may be generated.

Depending on the display, the illusion of placing the generated digital image "in front of" or "behind" the surface of the display may be at least partially realized by adjusting the size, orientation, shape (for example by applying a visual distortion) and/or location of a virtual object. For example, a reflection of picture frame may be augmented with an image which appears to be within the frame and which may change in size depending on a user's distance from the mirror, or in shape based on their relative orientation, etc. The location and/or shape of the augmentation within the frame may give the impression that the augmentation is co-located with the frame. In principle, any real object or surface may provide a visual anchor and may be utilised to give an impression that the augmentation has a 'depth' by changing the size, orientation, location and/or shape or the like of the augmentation with reference to the anchor object.

In some examples, the augmentation may comprise an augmentation of part of a scene around the user—i.e. the 'background'. It may add data, such as news or weather data, a diary schedule or the like, or may comprise additional information about the scene—for example, in a shop environment, the augmentation may comprise the prices of items viewed in reflection. In some examples, additional foreground and/or background objects may be generated.

Obtaining the reflected depth scan as per the arrangement of FIG. 1 (and as compared to systems in which the depth scan apparatus is directed at a subject) eases manufacture (as in other designs the spatial relationship of the mirror and the imaging apparatus must be strictly defined and maintained) and separates the components. For example, this may allow a non-technical mirror to incorporate augmentation. In addition, certain use cases, such as when a person is very close to the mirror, may be easier to capture than when the imaging apparatus is integral to the mirror.

In further embodiments, more than one depth scanner 104 could be used in order to improve the accuracy, completeness or field of view of the scene to be augmented. At least one of said scanners may allow 3D data to be transformed to determine the view from the user's perspective.

Figure 2:
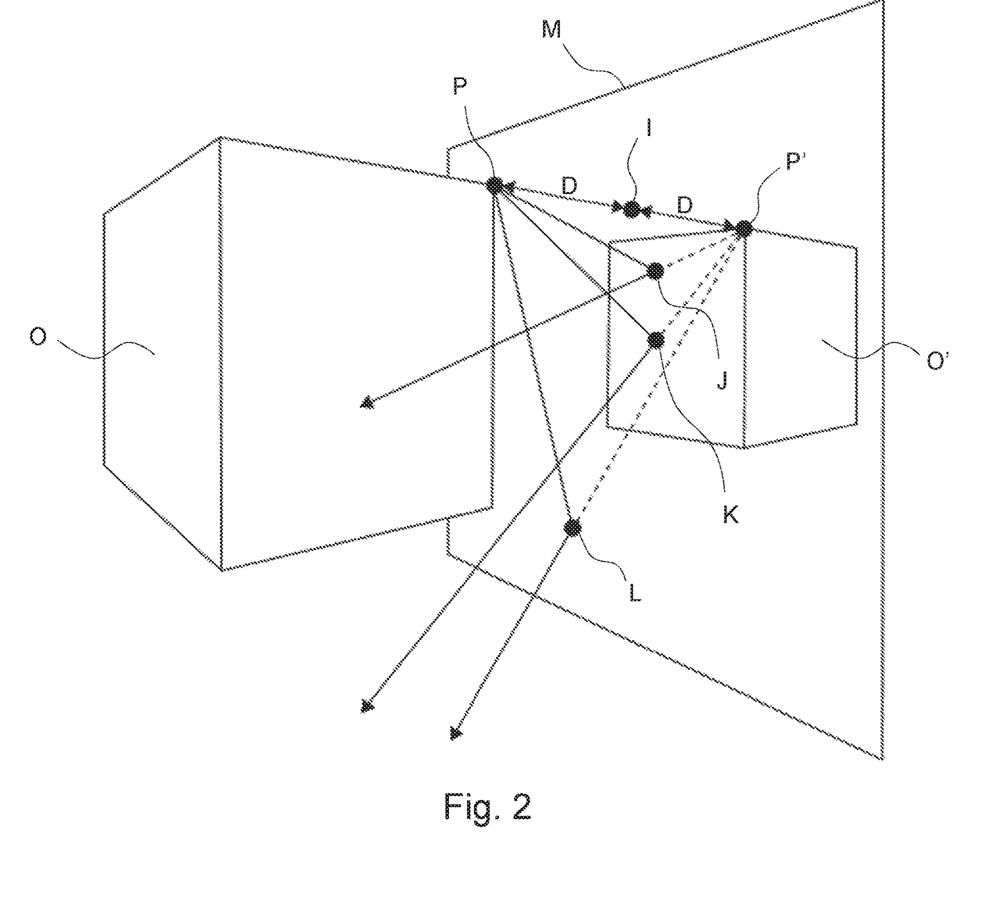
FIG. 2 shows an example of how an object may be located from a depth scan acquired via a reflective surface.

FIG. 2 shows an example of light reflected from a mirror.

Considering point P on object O at a perpendicular distance D from the plane of a mirror M, FIG. 2 shows three rays of light leaving point P in different directions. After reflecting off mirror M at points J, K and L, these rays all appear to have come from the same point P' on reflection O' at the same distance D behind the mirror. In other words, the exact location of a point on a real world object can be derived from knowledge of the 3-dimensional location of the reflected point and the 3-dimensional location of the mirror plane.

In some examples, 3-D locations may be measured relative to the optical centre of the 3D scanner. This allows the exact location of the corresponding point P on the real object (measured relative to the same origin and axes as the locations of point P' and plane M) to be calculated from the locations of point P' and plane M. For example, the depth scanner 104 may have a specific direction of view, the depth scanner would derive 3D positions (x, y, z) relative to the an (0,0,0) at the optical centre of the depth scanner 104, with X and Y axes in the horizontal and vertical directions that are perpendicular to the Z axis, which may be the direction of view of the depth scanner. All measurements of the positions of points in the mirror plane or points in the mirror reflection may be determined relative to this depth scanner coordinate system.

When the relative positions of the depth scanner 104 and the reflective surface 102 are known such that the reflective surface 102 (usually a reflective plane) can be defined, the 3-dimensional locations of the corresponding points on real object(s), even if they are not in the direct field of view of the depth scanner 104, can be defined.

Therefore, an accurate location of a point on a real world object can be derived from knowledge of the 3-dimensional location of the reflected point and the 3-dimensional location of the mirror plane (all such locations being specified in the same coordinate system).

Since the position of point P can be calculated from the position of point P' and the plane of the mirror M (all in the same coordinate system), it is also possible to transform all the 3D points such that transformed positions are measured relative to an origin centred at point P, with X and Y axes in the horizontal and vertical directions perpendicular to a Z axis in the direction of a line between P and P'. Use of such a working coordinate system removes any subsequent dependence on the position of the depth scanner.

In some examples, at least one absolute measurement may be obtained to provide a scale reference for all other measurements (e.g. based on the actual separation of the corners, or some other fixed point, on the mirror or more generally within the field of view of the scanner). In other examples, however, a depth scanner may provide sufficiently accurate depth without an additional calibration measurement. For example the scanner might calculate a distance to a point from the time light takes to travel from the scanner to that point and back to the scanner.

Figure 3:
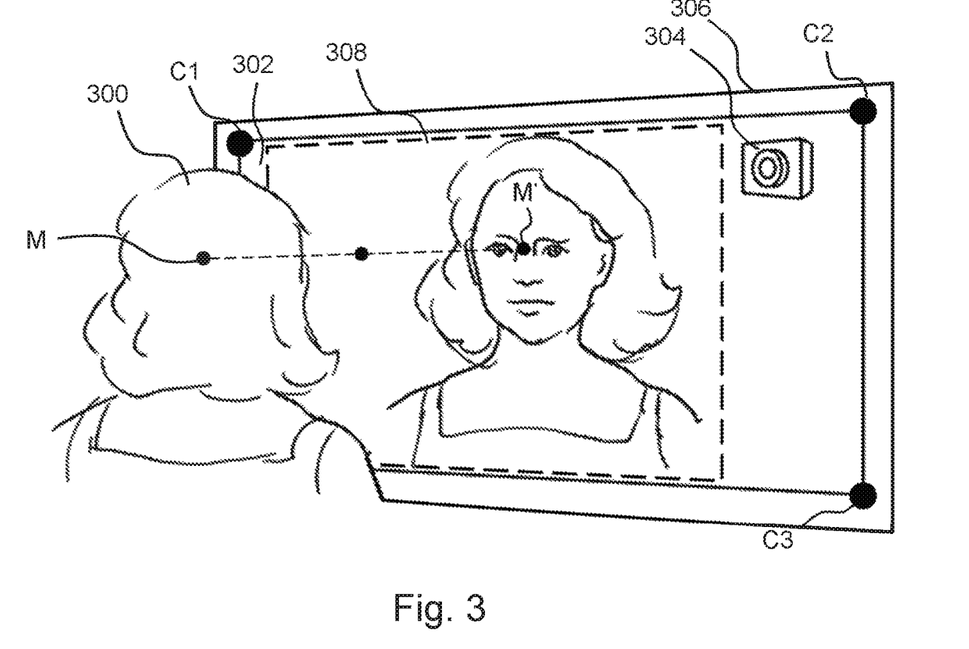
FIGS. 3 and 4 show another example of an augmented reality display system.

In the example above, the 3D locations of the mirror plane and reflected point P' may be relative measurements rather than absolute measurements. In some examples, relative measurements may be translated into absolute positions. For example, such a translation may be based on three absolute measurements in orthogonal axes for one point which is known in the relative measurement system, as well as the relationship between the absolute measurement axes and the relative measurement axes. In another example, two common points (six absolute measurements) may be determined and utilised with knowledge of the relationship of one axis in both systems to carry out the translation. In a further example, three common points (nine absolute measurements) may be used (without any prior knowledge of the axes of the coordinate axes), FIG. 3 shows an example of a subject 300 looking in a mirror 302, The mirror reflects an image of the subject 300 and also reflects an image of the depth scanner 304 (i.e. the scanner 304 is actually positioned separately from, and pointing towards, the mirror 302), which in this example comprises a depth camera which is also capable of acquiring visual images.

In this example, the image processor 108 processes the visual images (although in principle, the depth images may be processed) to identify the subject's eyes and there after the midpoint M between the eyes. The reflected midpoint M' is also determined. In this example, the image acquired by the depth scanner 304 comprises a scan of three reference locations C1, C2 and C3 of the mirror 302. These may be identified as reference locations, in this case, the corners of the mirror 302, using object recognition techniques. In other examples, the mirror 302 may be provided with at least one reference marker, for example, visually distinct tags. This allows the mirror plane to be determined. In non-planar reflective surfaces, additional reference points, and/or a model of the mirror surface may be acquired to determine the location of the reflective surface. For example, a model may comprise the key geometric characteristics of the mirror (size and curvature of surface for example).

While in some example the spatial relationship between a depth scanner and a reflective surface may be predetermined, by allowing the system 100 to determine the relationship, constraints on manufacture and deployment may be reduced, and the system 100 may 'auto calibrate'. In addition, by identifying features of the reflective surface, such as the corners, there is no need to provide specific markers.

In this example, the mirror 302 comprises an integral image generation engine 306, in this case driving a display panel 308 mounted behind the mirror, which is partially transmissive and partially reflective. The display panel 308 is mounted behind the mirror 302 from the point of view of the subject. In other examples, the mirror 302 may comprise a projector unit or the like.

Figure 4:
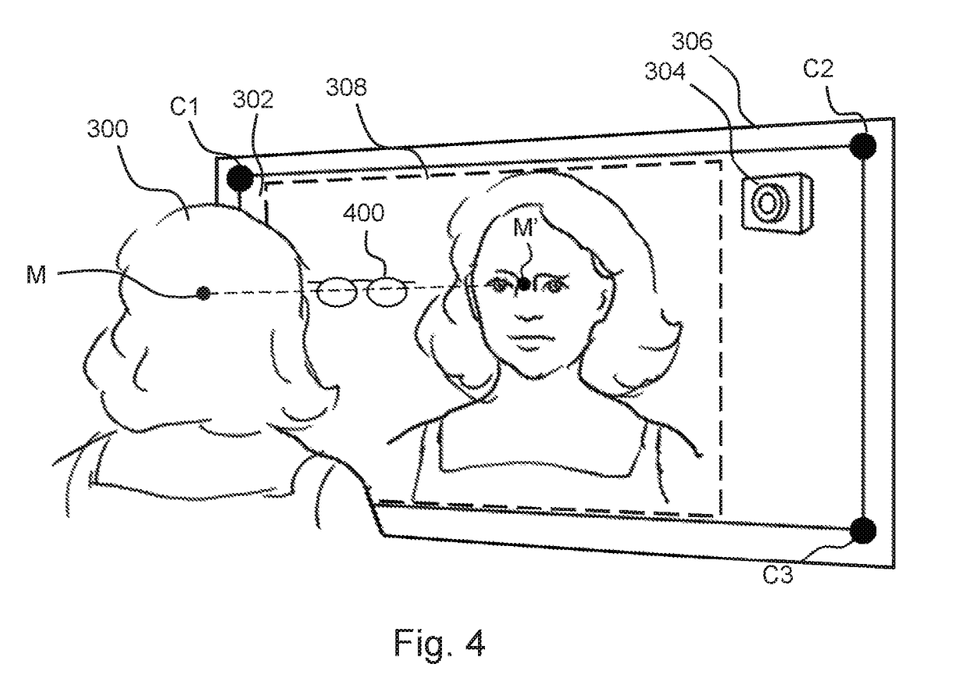

FIG. 4 shows an example of an augmented image generated using the apparatus shown in FIG. 3, in which a pair of glasses 400 is positioned within the reflected image. While the glasses 400 do not align with the eyes of the subject 300 from the point of view of FIG. 4, these will be aligned over the eyes from the point of view of the subject 300. This may, for example, allow 'virtual' trying on of different glasses frames.

In some examples, the display panel 308 may act as a mirror within a limited portion of its surface (or for a limited spectral range or during a limited temporal cycle) such that the eyes of the user can be captured along with a non-reflected view. For example, in a vehicle, a depth camera can be positioned to capture a reflection of a driver's eyes while also capturing a view of the road through the windscreen. The 3D data for the road may be transformed to derive the 3D view from the point of view of the driver which could then be augmented on the partially reflective surface to accurately overlay digital data such as navigation routes.

The process described above can be repeated to determine the eye positions and transformed views of more than one user reflected in the same reflective surface. As long as the users are sufficiently spaced apart, their individual views can be augmented without interfering with the views of others. Moreover the display technology is such that different display data can be presented to different users at the same time, the requirement for the users to be spaced apart can be relaxed or removed. For example, the display may comprise a 3D lenticular printed surface, which presents a different image according to the angle of view. This may present a different image to each eye of a single observer to create the impression of depth and/or could present a different augmentation image to each of a number of people viewing a surface (or more generally, to viewpoints) such that they each see an augmentation that is appropriate to their own viewpoint. Such augmentations can occur at the same point on the surface of the display without any specified spatial separation for the viewpoints.

The process may also be carried out over time, such that changes in viewpoint and/or objects within the scene may be accounted for.

It may be noted that a 3D model of digital data may be aligned to known points in a working coordinate system (e.g. a scanner coordinate system as described above) of the system, and may be transformed to generate augmentation data according to a determined viewpoint and a determined mirror plane (all in the same working coordinate system), without determining the relationship between the working coordinate system and some absolute world coordinate system. If 3D data measured relative to any secondary coordinate system (including an absolute world coordinate system) is to be incorporated in the augmentation, the relationship between the working coordinate system and the secondary coordinate system may be acquired or determined. This can be achieved by identifying common points that are known in both coordinate systems. For example, a secondary coordinate system might have an origin in one corner of a room containing the mirror, with X and Y axes pointing North and West, and the Z axis running vertically. If the positions of fixed reference points C1, C2 and C3 are known in this secondary coordinate system as well as in the working coordinate system, the 'world' coordinates can be transformed into working coordinates or vice versa.

Figure 5:
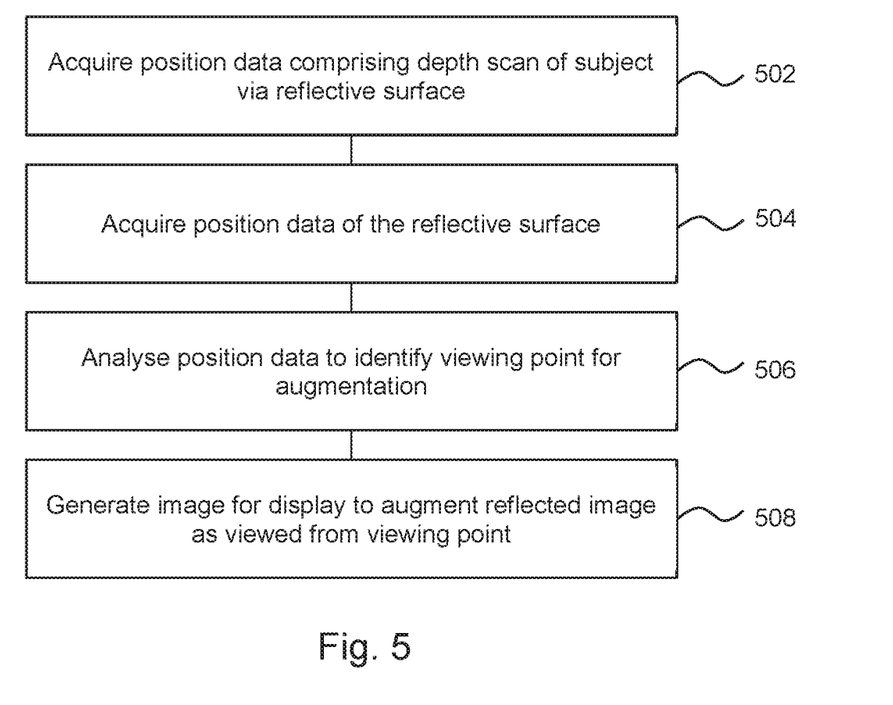
FIG. 5 is a flowchart of an example method of augmenting a reflected image.

FIG. 5 is an example of a method of augmenting an image comprising, in block 502 acquiring position data comprising a depth scan of a subject via a reflective surface. For example, such a scan may be acquired using the apparatus described above, and the reflective surface may comprise a mirrored surface. Block 504 comprises acquiring position data comprising a depth scan of the reflective surface, for example, allowing a mirror plane to be defined. The position data may comprise, in addition to the depth scan, other position data such as image data which allows a position to be determined relative to a point on the subject and/or reflective surface.

Block 506 comprises analysing the acquired position data to identify a viewing point for a reflected image augmentation. As described above, this may comprise locating a viewer's eyes (and, in some examples, thereby locating a position substantially midway between the eyes) or an image capture device within the captured data, or some other view point. To that end, bock 506 may further comprise analysing the position data of the mirror to define a mirror plane, as described above.

A 2D projection of the position data from the viewpoint of the midpoint of the user's eyes (i.e. a point approximately midway between the eyes) onto the plane of a display panel behind the reflective surface may be calculated. In some examples, the origin for the 2D projection would be the top left corner of the addressable area of the display panel behind the mirror, which corresponds to a standard location of a (0,0) coordinate in a 2D display (although other origins may be used).

In block 508, an image is generated for display on the reflective surface, the generated image augmenting the image reflected (e.g. the image of the subject) in the reflective surface as viewed from the viewing point. This may for example comprise generating appropriate digital data to augment the 2D projection (e.g. to align a 2D projection of a 3D model of an object, for example a 2D projection of a 3D model of a pair of glasses) with an intended location in the image, according to the depth data from the camera (e.g. such that the glasses appear to be correctly positioned on the user's face).

The method may for example be carried out using the apparatus as described above.

Figure 6:
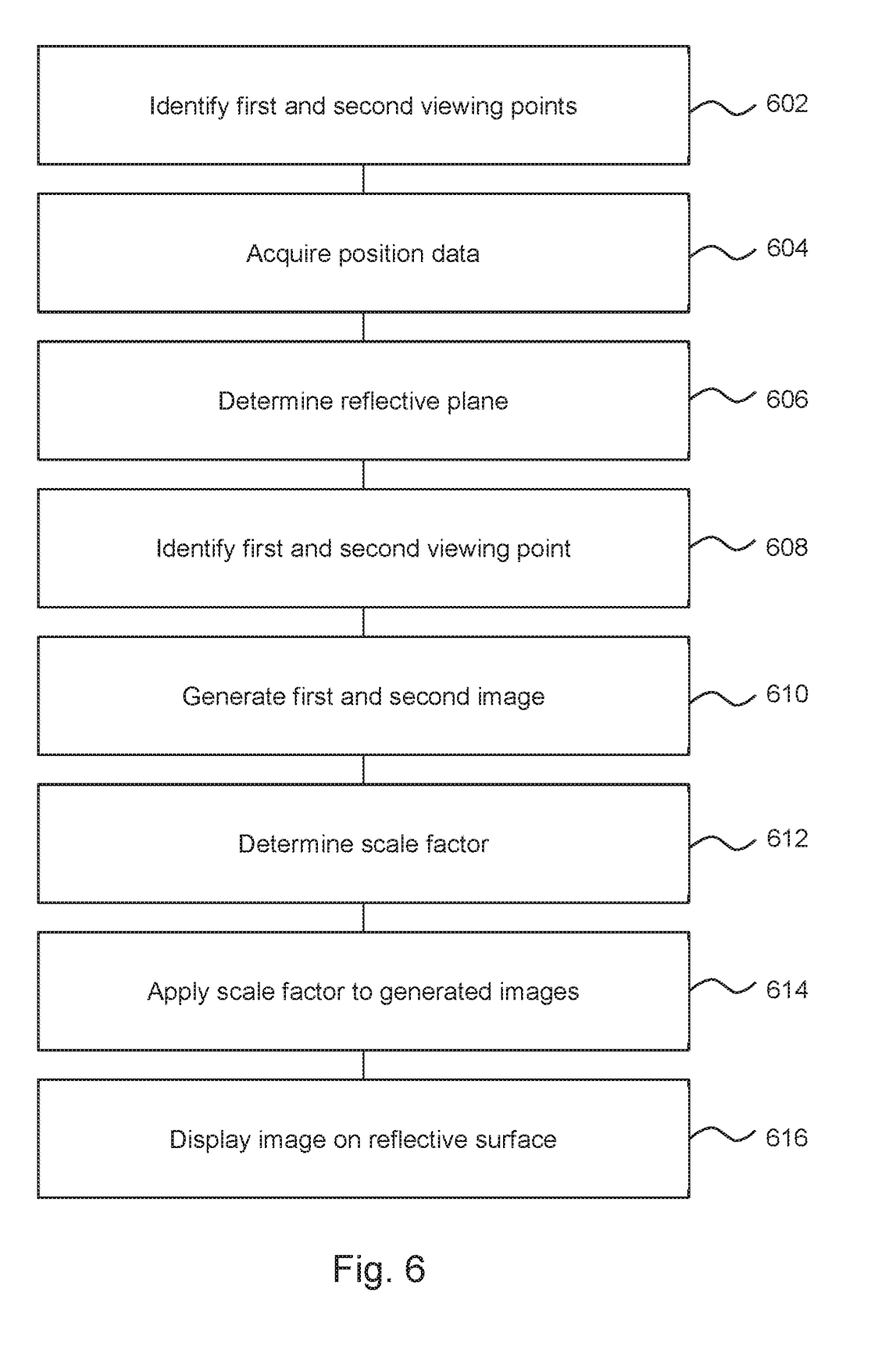
FIG. 6 is a flowchart of another example of a method of augmenting a reflected image.

FIG. 6 is another example of a method of augmenting an image. In the example of FIG. 6, block 602 comprises acquiring position data comprising a depth scan and image data of a human subject via a reflective surface. Block 604 comprises acquiring position data comprising a depth scan and image data of the reflective surface. Block 606 comprises determining a reflective plane from the depth scan and/or image data of the reflective surface. For example, this may comprise identifying at least one (and in some examples, at least three) reference location from a depth scan/image of the reflective surface. The points may for example comprise any or any combination of corners, edge points, points on a mirror frame, or points within the area of the mirror (e.g. mirror fixing points).

Block 608 comprises identifying a first and a second viewing point for a reflected image augmentation. In this example the first and second viewing points are the subject's left and right eyes. Block 610 comprises generating a first and a second image, each generated image augmenting the image of the subject in the reflective surface as viewed from each of the subject's eyes. Block 612 comprises determining a scale factor and block 614 comprises applying the scale factor to the generated images. For example, the scale factor may be applied so that the real world coordinates of the 2D projection are mapped to a corresponding set of pixel values at the spatial resolution of a display panel or the like. Block 616 comprises displaying the image on the reflective surface.

Figure 7:
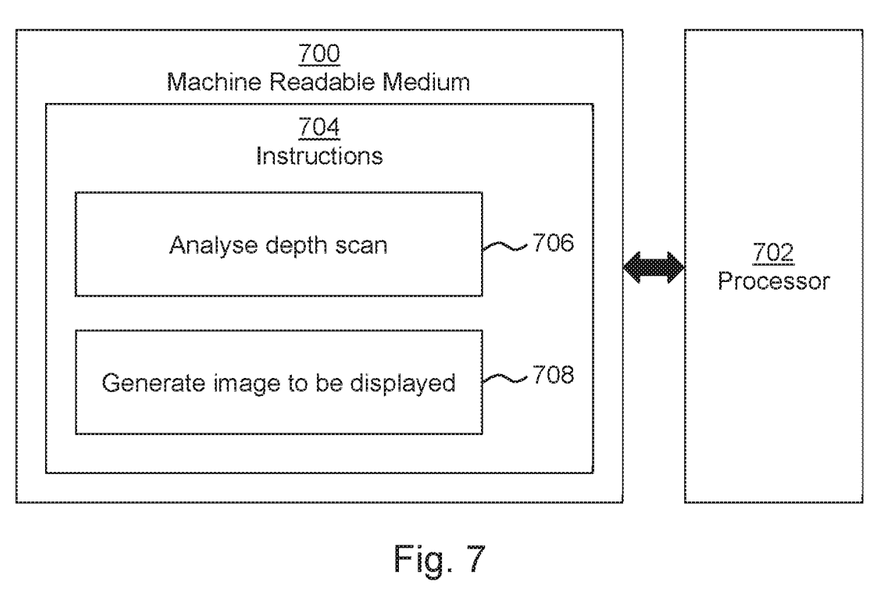
FIG. 7 is a representation of a machine readable medium in association with processing circuitry.

FIG. 7 is an example of a tangible and non-transitory machine readable storage medium 700 in association with a processor 702. The machine readable storage medium 700 stores instructions 704 which, when executed, cause the processor 702 to carry out certain processes. The instructions 704 comprise instructions 706 to cause the processor to analyse a depth scan of a subject acquired via a reflective surface to determine a viewing point and instructions 708 to generate an image to be displayed on the reflective surface to augment the reflected image as viewed from the viewing point. In some examples, the instructions 704 comprise instructions which when executed by the processor 702, cause the processor 702 to determine a scale factor based on the spatial resolution of a display device, and apply the scale factor to the generated image.

Examples in the present disclosure can be provided as methods, systems or machine readable instructions, such as any combination of software, hardware, firmware or the like. Such machine readable instructions may be included on a machine readable storage medium (including but is not limited to disc storage, CD-ROM, optical storage, etc.) having machine readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some flows and blocks in the flow charts and block diagrams, as well as combinations thereof can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus functional modules of the apparatus and devices (for example, the image processor 108 and the image generation engine 110) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a machine readable storage (e.g. a tangible machine readable storage medium) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. An augmented reality display system comprising:
a reflective surface;
a depth scanner; and
processing apparatus comprising an image processor and an image generation engine:
wherein:
the depth scanner is to scan the reflective surface and a subject via the reflective surface to acquire depth data;
the image processor is to determine, based on the depth data, a viewpoint for an augmentation of a reflected image; and
the image generation engine is to generate the augmentation for display on the reflective surface.

2. An augmented reality display system according to claim 1 wherein the depth scanner is to acquire a scan of three reference locations of the reflective surface.

3. An augmented reality display system according to claim 2 wherein the reference locations comprise at least one corner of the reflective surface.

4. An augmented reality display system according to claim 1 wherein the depth scanner comprises a camera.

5. An augmented reality display system according to claim 1 wherein the subject comprises a human subject and the viewpoint is substantially midway between the human subject's eyes.

6. An augmented reality display system according to claim 1 wherein the image generation engine is integral to the reflective surface.

7. An augmented reality display system according to claim 1 wherein the reflective surface comprises a mirrored surface.

8. An augmented reality display system according to claim 1 further comprising a display panel, the display panel being mounted behind the reflective surface from a point of view of the subject.

9. A method comprising:
acquiring position data comprising a depth scan of a subject via a reflective surface;
acquiring position data comprising a depth scan of the reflective surface;
analysing the position data to identify a viewing point for a reflected image augmentation; and
generating an image to be displayed on the reflective surface, the generated image augmenting a reflected image in the reflective surface as viewed from the viewing point.

10. A method according to claim 9 further comprising determining a reflective plane from the acquired position data of the reflective surface.

11. A method according to claim 9 wherein the subject is a human subject, and analysing the position data to identify a viewpoint comprises identifying the viewpoint of the human subject.

12. A method according to claim 11 further comprising analysing the position data to identify a viewpoint for each eye of the subject, and generating an image to be displayed on the reflective surface comprises generating a first and a second image, each generated image augmenting the reflected image as viewed from each eye.

13. A method according to claim 9 further comprising determining a scale factor based on a spatial resolution of a display device, and applying the scale factor to the generated image.

14. Tangible and non-transitory machine readable storage medium comprising instructions which, when executed by a processor, cause the processor to:
- analyse a depth scan of a subject acquired via a reflective surface to determine a viewing point; and
- generate an image to be displayed on the reflective surface to augment a reflected image of the subject as viewed from the viewing point.

15. Tangible and non-transitory machine readable storage medium according to claim 14 further comprising instructions which executed by a processor, cause the processor to determine a scale factor based on a spatial resolution of a display device, and to apply the scale factor to the generated image.

* * * * *